United States Patent Office 3,422,088
Patented Jan. 14, 1969

3,422,088
PHOSPHOROUS OXYHALIDE CROSS-LINKED
HYDROXYPROPYL STARCH DERIVATIVE
John V. Tuschhoff, Gene L. Kessinger, and Cleo E. Hanson, Macon, Ill., assignors to A. E. Staley Manufacturing Company, Decatur, Ill., a corporation of Delaware
No Drawing. Filed Aug. 2, 1965, Ser. No. 476,663
U.S. Cl. 260—233.3                    3 Claims
Int. Cl. A23l 1/14; C08b 19/00

ABSTRACT OF THE DISCLOSURE

A phosphorus oxyhalide cross-linked hydroxypropyl cereal starch having a hydroxypropyl D.S. of 0.10 to 0.30 and pH6.5 salt CIV viscosity of about 60 to 100 grams centimeter after 10 minutes and 80 to 150 grams centimeter after 40 minutes suitable for the preparation of thin-thick starch pastes which attain their full viscosity after cooking under pressure.

---

This invention relates to a granular cereal starch thickener which does not develop appreciable viscosity when cooked in water with foods at atmospheric pressure but that does develop appreciable viscosity when cooked under superatmospheric pressure. More particularly, this invention relates to a granular phosphorus oxyhalide cross-linked hydroxypropyl cereal starch having a hydroxypropyl D.S. (degree of substitution) of at least 0.10 which does not develop appreciable viscosity when cooked in water with salt or foods containing salt at atmospheric pressure but that does develop appreciable viscosity when cooked under superatmospheric pressure.

Starches have been used for years as thickeners for a wide variety of foods. As technology in the food industry has become more and more sophisticated, the food industry has required tailor-made starch thickeners having a variety of specific properties. For example, there has developed in recent years a demand for fruit pie thickeners which were capable of being cooked with other ingredients of the pie filling to form a paste, which, when hot, has sufficient consistency or viscosity so that it will prevent the fruit from rising to the top or settling to the bottom of the pie during machine depositing; the cooked filling on cooling must thicken to consistency which is neither watery nor too stiff; the cooled paste must be transparent, clear and brilliant and not cloudy. The paste must be short and not stringy; the starch must be freeze-thaw resistant, etc. Commonly assigned application Ser. No. 102,365 filed Apr. 12, 1961, now U.S. Patent 3,238,193, discloses a series of cross-linked cereal starch acylates having all of the above properties to a high degree.

More recently, the canning industry has expressed a need for a starch thickener that does not develop appreciable viscosity when cooked with foods at atmospheric pressure but that will develop appreciable viscosity under retort cooking conditions (240–260° F.). A starch thickener of this type permits the canner to heat the food and starch to retort temperatures much more rapidly than normal since here is much better heat transfer. Shortening cooking time for food products not only reduces operating costs but also improves the quality of the products. It is, of course, self-evident that the pasted starch upon cooling must impart the necessary flow and viscosity to the finished product. Likewise for most uses, the starch paste must be freeze-thaw resistant.

As pointed out in commonly assigned application Ser. No. 102,365, now U.S. Patent 3,238,193, starches may be classified into two broad classes, one class comprising common cereal starches (corn, rice, wheat, for example) and the other class comprising root or root-type starches (potato, waxy maize, waxy sorghum, cassava, for example). For the purpose of this application "root-type" includes root and root-type starches. When root and root-type starches are cooked in water and then cooled, starch pastes are formed which are more viscous and more stable in viscosity than cereal starch pastes which have been prepared in the same way. When the root-type starch paste is cooled to room temperature, the starch paste retains its viscous character, clarity and texture to a far greater extent than a cereal starch paste which has been treated in the same manner. The cereal starch paste usually forms an opaque gel on cooling. The differences in the paste viscosity characteristics of root and root-type starches on the one hand and of cereal starches on the other hand has lead to the preferential use of root and root-type starches as food thickeners even though the root and root-type starches are frequently more expensive than the readily available cereal starches.

The general object of this invention is to provide a cereal starch thickener which does not develop appreciable viscosity when cooked at atmospheric pressure with salt or foods containing salt but that develops appreciable viscosity under retort cooking conditions. Starches of this type will be referred to herein as thin-thick starches. Other objects will appear hereinafter.

We have now found that the object of our invention can be obtained with granular phosphorous oxyhalide cross-linked hydroxypropyl cereal starches having a hydroxypropyl D.S. of at least 0.10. For the purposes of our invention, it is essential that (1) the cereal starch must have a hydroxypropyl D.S. of at least 0.10, (2) the product must be prepared by reacting phosphorous oxyhalide with granular hydroxypropyl cereal starch and (3) the extent of phosphorus oxyhalide cross-linking must be within very narrow limits as set forth below.

As indicated above, it is important that the starch be freeze-thaw resistant. A starch is generally considered to be freeze-thaw resistant when material amounts of water are not synerized from the starch paste during thawing. For example, food products which are not freeze-thaw resistant become watery after defrosting and especially after cooking. While uncross-linked cereal starches having a hydroxypropyl D.S. of at least 0.10 are not subject to syneresis, they exhibit another form of freeze-thaw instability. The hydroxypropyl starch pastes tend to gel and thicken markedly after undergoing one or two freeze-thaw cycles. Thus gelling and thickening is similar to the retrogradation of underivatized amylose and may be due to hydrogen bonding and/or orientation of starch molecules. This freeze-thaw instability is overcome by a controlled amount of cross-linking with a phosphorous oxyhalide.

Further, even if the cereal starch meets both of these criteria (hydroxypropyl D.S. of 0.10 and cross-linked with phosphorus oxyhalide) the starch will not be freeze-thaw resistant if the cross-linking step is performed before hydroxypropylation. The reason for this is not clear. However, the alkalinity necessary for hydroxypropylation may cause a partial hydrolysis of phosphate cross-links and/or ester interchange.

The hydroxypropyl groups of the cereal starches of this invention not only contribute to the freeze-thaw resistance of the derivatized cereal starch but are also responsible for the excellent clarity of the starch paste, texture of the starch paste and reduced pasting temperature of the starch. The uncross-linked hydroxypropyl cereal starches paste readily on cooking and reach peak viscosity rapidly. On continued cooking the viscosity of the granular uncross-linked hydroxypropyl cereal starches drops precipitously. Accordingly, the uncross-linked hydroxypropyl cereal starches are unsuitable for most food uses since they are not freeze-thaw resistant and have an unstable viscosity. Further, their high initial viscosity prevents their use as thin-thick starches in our invention.

Cross-linking the hydroxypropyl cereal starches with phosphorus oxyhalide imparts freeze-thaw resistance as indicated above, gives the starch paste greater viscosity stability and permits their conversion into thin-thick starches. The degree of cross-linking must be carefully controlled. If the hydroxypropyl cereal starch is reacted with too much phosphorus oxyhalide, the starch will be inhibited, i.e., incapable of pasting. On the other hand, if the hydroxypropyl cross-linked cereal starch is reacted with too little phosphorus oxyhalide, the final product will not have the necessary viscosity characteristics and/or freeze-thaw resistance. Accordingly, it is preferred to treat the hydroxypropyl cereal starches with an amount of phosphorus oxyhalide equivalent to 0.01 to 0.05 part by weight phosphorus oxychloride for each 100 parts by weight hydroxypropyl starch on a dry solids basis. As in the case of application Ser. No. 102,365, now U.S. Patent 3,238,193, it is not the amount of phosphorus oxyhalide which is added to the reaction vessel that controls the properties of the final product, but it is the amount of phosphorus oxyhalide which is reacted with the hydroxypropyl cereal starch.

While alkaline fluidity determinations are convenient for determining and controlling the extent of cross-linking in application Ser. No. 102,365, this method is not as useful for controlling the extent of cross-linking in this invention. This is due to the fact that the base starch (hydroxypropyl starch) will have a different alkaline fluidity depending upont he extent of hydroxypropylation of the starch. For example underivatized starch has a two-gram alkaline fluidity of about 36 cc. On the other hand, hydroxypropyl starch having a D.S. of about 0.10 has a 2-gram alkaline fluidity of about 18 cc. Accordingly, controlling the extent of cross-linking by alkaline fluidity is not too accurate. However, it has been found that hydroxypropyl cereal starches having hydroxypropyl D.S. of about 0.10 to about 0.20 should have an alkaline fluidity in the range of about 50 cc. to about 75 cc.

It has been found that the degree of cross-linking is best controlled by a 40-minute pH 6.5 buffered salt CIV viscosity cook. The details of this test are described below. This CIV viscosity cook is representative of the conditions under which canners cook starch and various foods. It is, of course, well known that salts retard the gelatinization of starches. However, it is also well known that most food preparations have various condiments added, particularly salt, and allowance must be made for the effect of salt on the gelatinization of the granular starch.

In a pH 6.5 buffered salt cook, uncross-linked granular hydroxypropyl cereal starches reach a peak viscosity of over 400 gram-centimeters after cooking at about 200° F. for about 3 or 4 minutes. The viscosity drops rapidly to about 150 gram-centimeters or less. The reaction of the first increments of phosphorus oxyhalide with granular hydroxypropyl cereal starch increases the initial peak viscosity of the hydroxypropyl starch. As more phosphorus oxyhalide reacts witht he hydroxypropyl starch, the peak viscosity of the hydroxypropyl starch is reduced and the 40-minute viscosity increased, which means that the cross-linked hydroxypropyl cereal starch has a more stable viscosity than the parent uncross-linked starch. For use in our invention, the hydroxypropyl phosphorus oxyhalide cross-linked cereal starch is cross-linked to an extent such that the peak viscosity of the starch is obtained after cooking the starch for 40 minutes. In other words, the starch does not exhibit any peak viscosity immediately after pasting. The starches of our invention have a pH 6.5 buffered salt CIV viscosity of about 60 to 150 gram-centimeters on cooking for 10 minutes and a viscosity of about 80 to 150 gram-centimeters on cooking for 40 minutes under the same conditions.

Surprisingly, we have found that the cross-linked hydroxypropyl cereal starches of this invention, which have thin-thick pasting characteristics, when cooked with food products containing salt, also exhibit excellent properties as fruit pie-starch thickeners. This is quite surprising since one of the requirements of a good fruit pie starch thickener is that it have a high initial peak viscosity when cooked at a pH of about 3.5 in order to prevent the fruit from separating during machine depositing.

As indicated above, the granular hydroxypropyl cross-linked cereal starch derivatives utilized in this invention are prepared by reacting phosphorus oxyhalide, such as phosphorus oxychloride or phosphorus oxybromide, with an aqueous alkaline suspension (pH 9–13) of granular hydroxypropyl cereal starch. The phosphorus oxyhalides are uniquely suitable for cross-linking the granular hydroxypropyl cereal starch since (1) they react rapidly and completely in a relatively short time, (2) they can be added incrementally, and (3) their cross-linkages are gradually saponified at the same pH as the cross-linking reaction is effected. Each of these properties contribute to making the in process CIV viscosity control feasible. Accordingly, phosphorus oxyhalide cross-linking is susceptible of the close control which is necessary in our invention.

For the purposes of our invention, it is not too important how the granular hydroxypropyl cereal starch is produced as long as it has a minimum hydroxypropyl D.S. of at least 0.10, preferably 0.11 to 0.30. It can be prepared by reacting propylene oxide with an alkaline (pH 9–13) polar (water, ethanol, dioxane) solvent suspension of granular cereal starch or by dry reaction techniques. In general the most uniform substitution at the lowest cost is obtained by reacting an aqueous alkaline suspension of granular cereal starch with from about 7 to 30% by weight propylene oxide. When water is employed as the suspending medium for the hydroxypropylation reaction, a typical salt gelatinization inhibitor such as sodium sulfate, sodium chloride, etc. should be used. The alkaline pH is established with a basic material such as alkaline metal hydroxides (sodium or potassium hydroxide) alkaline earth metal hydroxides (calcium or barium hydroxide), tetraalkylammonium hydroxide (tetraethylammonium hydroxide), sodium carbonate, sodium phosphate, etc.

The hydroxypropyl cross-linked starch is then carefully washed after the reaction of phosphorus oxyhalide in order to remove all contaminants. The resulting granular product can then be gelatinized on hot rolls or in an extruder or, as is generally preferred, shipped in granular form to the ultimate user.

The examples following are merely illustrative and should not be construed as limiting the scope of the invention.

The alkaline fluidity test referred to in the examples that follow is performed in the following manner. Two grams hydroxypropyl cross-linked starch (dry basis) is placed in a 400 ml. fluidity beaker. The starch is then diluted to approximately 100 ml. with an aqueous solution containing 0.95 gram of sodium hydroxide. The starch suspension is stirred at between 450 to 460 r.p.m. for 3 minutes in order to paste the starch. The resulting starch solution is poured into a standard fluidity funnel having a specific water-time of between about 30 to 40 seconds. The number of cc. of starch solution which flows through the funnel in the water-time is the alkaline fluidity of the starch.

The pH 6.5 buffered salt CIV viscosity is determined in the following manner. Fifty grams of starch (dry solids basis) is suspended in 940 grams of a pH 6.5 buffer solution. The buffered solution comprises a 1% by weight aqueous solution of disodium phosphate ($Na_2HPO_4$) and 0.2% by weight sodium benzoate which has been adjusted to pH 6.5 with citric acid (approximately .35 gram of citric acid is required by each 100 grams of solution). Ten grams of sodium chloride is added to 990 grams of starch slurry. The starch-buffered salt slurry is added to the CIV viscometer with the CIV viscometer running with the temperature of the CIV viscometer maintained at about 201–203° F. The viscosity is recorded at its peak and at 10 and 40 minutes after the suspension has been placed in the viscometer.

EXAMPLE 1

A granular phosphorus oxychloride cross-linked hydroxypropyl cereal starch of this invention was prepared in the following manner. Three hundred parts by weight sodium sulfate was added to 1,000 parts by weight of granular corn starch (dry solids basis) suspended in 1150 parts by weight water. After the starch suspension was heated to about 110° F., ten parts by weight sodium hydroxide (dry solids basis) was added as an aqueous 5% by weight solution to the suspension. Nitrogen gas was bubbled through the starch slurry in order to replace the air in the reaction vessel and the reaction vessel was sealed. Then 82.5 parts by weight propylene oxide was added to the starch slurry through a dip-tube while the reaction mixture was maintained at 108 to 112° F., continuously sparged with nitrogen and stirred for 18 hours. Nitrogen sparging was discontinued; the reaction vessel was unsealed and 0.16 part by weight phosphorus oxychloride was added to the granular hydroxypropyl starch slurry. After reacting for ½ hour, the pH 6.5 buffered salt CIV viscosity of a sample of the phosphorus oxychloride cross-linked hydroxypropyl cereal starch was determined. The product had no initial peak viscosity. The viscosity after 10 minutes was 84 gm.-cm. and after 40 minutes was 107 gm.-cm. The starch suspension was filtered, washed with water, reslurried with water, adjusted to pH 5, filtered again, washed carefully, and dried to between 9 to 11% moisture. The granular product had a two gram alkaline fluidity of about 60 cc. and 4.5% by weight hydroxypropyl groups (hydroxypropyl D.S. of 0.135).

EXAMPLE 2

This example illustrates the preparation of two similar phosphorus oxychloride cross-linked hydroxypropyl cereal starches which are unsuitable for use in our invention. Example 1 was repeated except that (a) 0.09 part by weight phosphorus oxychloride was reacted with hydroxypropyl starch slurry for one hour, which is referred to hereinafter as sample 2A, and (b) hydroxypropyl cross-linked starch was reacted with 0.12 part of phosphorus oxychloride for 1 hour, which is referred to as sample 2B. The properties of these products are set forth below in Table I.

TABLE I

| Sample | Hydroxy-propyl D.S. | pH 6.5 buffered salt CIV, viscosity in gm.-cm. after— | | | Two gram alkaline, fluidity in cc. |
|---|---|---|---|---|---|
| | | 10 min. | 40 min. | Peak | |
| 2A | .15 | 292 | 245 | 340 | 7 |
| 2B | .12 | 210 | 203 | 220 | 18 |

EXAMPLE 3

This example illustrates the thin-thick viscosity characteristics of the cross-linked cereal starch of Example 1 as contrasted to the closely related products of Example 2. The starch samples were cooked at 5 percent by weight dry substance in a pH 6.5 buffered salt solution for either 25 minutes at steam bath temperature (180° F.) or autoclaved at 15 p.s.i.g. and 250° F. for 15 minutes. The samples were brought back to 5% total solids with pH 6.5 buffer and the Brookfield viscosity of the 5% pastes was measured as the pastes cooled to 180° F., 120° F., 75° F., and after standing overnight at room temperature. The results are set forth below in Table II.

TABLE II

| Starch sample from example | Viscosity after atmospheric cooking | | | | Viscosity after autoclaving | | | |
|---|---|---|---|---|---|---|---|---|
| | 180° F. | 120° F. | 75° F. | Overnight | 180° F. | 120° F. | 75° F. | Overnight |
| 1 (cps.) | 700 | 1,530 | 3,200 | 3,300 | 1,900 | 3,100 | 5,000 | 5,700 |
| 2A (cps.) | 3,700 | 5,700 | 8,400 | 10,720 | 3,000 | 5,700 | 9,000 | 10,800 |
| 2B (cps.) | 2,120 | 3,280 | 5,600 | 6,000 | 2,650 | 4,000 | 6,600 | 6,800 |

EXAMPLE 4

Example 1 was repeated except that the concentration of propylene oxide in the hydroxypropylation step was increased from 82.5 parts to 100 parts by weight. The phosphorus oxyhalide cross-linked hydroxypropyl cereal starch had 5.2% by weight hydroxypropyl groups (D.S. 0.15) and had a pH 6.5 buffered salt CIV viscosity of 85 gram-centimeters after 10 minutes and 90 gram-centimeters after 40 minutes.

Essentially the same results are obtained by replacing the granular corn starch with granular wheat starch or rice starch.

Since many embodiments of this invention may be made and since many changes may be made in the embodiments described, the foregoing is to be interpreted as illustrative only and our invention is defined by the claims appended hereafter.

We claim:
1. A phosphorus oxyhalide cross-linked hydroxypropyl cereal starch having a hydroxypropyl D.S. of 0.10 to 0.30 and pH 6.5 buffered salt CIV viscosity of about 60 to 150 gram-centimeters after 10 minutes, 80 to 150 gram-centimeters after 40 minutes and the 40 minute viscosity is higher than the 10 minute viscosity.

2. A granular phosphorus oxyhalide cross-linked hydroxypropyl cereal starch having a hydroxypropyl D.S. of 0.10 to 0.30 and pH 6.5 buffered salt CIV viscosity of about 60 to 150 gram-centimeters after 10 minutes, 80 to 150 gram-centimeters after 40 minutes and the 40 minute viscosity is higher than the 10 minute viscosity.

3. A phosphorus oxyhalide cross-linked hydroxypropyl corn starch having a hydroxypropyl D.S. of 0.10 to 0.30 and pH 6.5 buffered salt CIV viscosity of about 60 to 150 gram-centimeters after ten minutes, 80 to 150 gram-centimeters after 40 minutes and the 40 minute viscosity is higher than the 10 minute viscosity.

References Cited

UNITED STATES PATENTS 3,278,522  10/1966  Goldstein et al. ____ 260—233.3

DONALD E. CZAJA, *Primary Examiner.*

R. W. MULCAHY, *Assistant Examiner.*

U.S. Cl. X.R.

99—139